US009680717B2

(12) United States Patent
Bourgart

(10) Patent No.: US 9,680,717 B2
(45) Date of Patent: Jun. 13, 2017

(54) PROCESSING OF DATA FOR THE MANAGEMENT OF PLACEMENT ON STANDBY

(75) Inventor: Fabrice Bourgart, Perros Guirec (FR)

(73) Assignee: Orange, Paris (FR)

( * ) Notice: Subject to any disclaimer, the term of this patent is extended or adjusted under 35 U.S.C. 154(b) by 263 days.

(21) Appl. No.: 13/881,212

(22) PCT Filed: Oct. 27, 2011

(86) PCT No.: PCT/FR2011/052516
§ 371 (c)(1),
(2), (4) Date: Apr. 24, 2013

(87) PCT Pub. No.: WO2012/056181
PCT Pub. Date: May 3, 2012

(65) Prior Publication Data
US 2013/0232265 A1    Sep. 5, 2013

(30) Foreign Application Priority Data
Oct. 27, 2010   (FR) ...................................... 10 58871

(51) Int. Cl.
*G06F 15/16*     (2006.01)
*H04L 12/26*     (2006.01)
(Continued)

(52) U.S. Cl.
CPC .......... *H04L 43/00* (2013.01); *H04J 14/0227* (2013.01); *H04J 14/0282* (2013.01); *H04L 12/12* (2013.01); *H04L 12/2898* (2013.01); *H04L 41/0833* (2013.01); *H04Q 11/0067* (2013.01); *H04J 14/0254* (2013.01); *H04J 14/0269* (2013.01); *H04L 43/08* (2013.01);
(Continued)

(58) Field of Classification Search
CPC ............................... H04L 43/08; H04L 43/10
USPC ................................................... 709/223, 224
See application file for complete search history.

(56) References Cited

U.S. PATENT DOCUMENTS 8,073,329 B2    12/2011  Gao et al.
8,452,178 B2     5/2013  Gao et al.
(Continued)

FOREIGN PATENT DOCUMENTS

CN         1988502 A    6/2007
CN       101526846 A    9/2009
(Continued)

OTHER PUBLICATIONS

English Translation of Office Action issued for CN 201180063665.1 (Apr. 30, 2015).

*Primary Examiner* — Adnan Mirza
(74) *Attorney, Agent, or Firm* — Drinker Biddle & Reath LLP

(57) ABSTRACT

A processing of data for the management of the placement on standby of a client terminal connected to an operator terminal of an access network, the method comprising, in said client terminal, the following steps: a) determining a policy for placing the client terminal on standby, b) monitoring a client interface of said client terminal, disposed between said client terminal and a part of a local network situated downstream of said client terminal, c) monitoring an access network interface of said client terminal, disposed between said client terminal and said operator terminal.

14 Claims, 6 Drawing Sheets

(51) Int. Cl.
*H04J 14/02* (2006.01)
*H04L 12/12* (2006.01)
*H04L 12/28* (2006.01)
*H04L 12/24* (2006.01)
*H04Q 11/00* (2006.01)

(52) U.S. Cl.
CPC ...... *H04Q 2011/0081* (2013.01); *Y02B 60/32* (2013.01); *Y02B 60/34* (2013.01); *Y02B 60/35* (2013.01)

(56) References Cited

U.S. PATENT DOCUMENTS

| | | |
|---|---|---|
| 8,913,890 B2 | 12/2014 | Gao et al. |
| 2004/0130581 A1* | 7/2004 | Howard et al. ............... 345/854 |
| 2007/0140691 A1 | 6/2007 | Gao et al. |
| 2008/0084941 A1 | 4/2008 | Mohanty et al. |
| 2010/0111523 A1 | 5/2010 | Hirth et al. |
| 2010/0118753 A1* | 5/2010 | Mandin et al. ............... 370/311 |
| 2012/0027411 A1 | 2/2012 | Gao et al. |
| 2013/0236179 A1 | 9/2013 | Gao et al. |
| 2015/0030329 A1 | 1/2015 | Gao et al. |

FOREIGN PATENT DOCUMENTS

| | | |
|---|---|---|
| EP | 1 940 051 A1 | 7/2008 |
| WO | WO 2009/054581 A1 | 4/2009 |

\* cited by examiner

PROCESSING OF DATA FOR THE MANAGEMENT OF PLACEMENT ON STANDBY

CROSS-REFERENCE TO RELATED APPLICATIONS

This application is the U.S. national phase of the International Patent Application No. PCT/FR2011/052516 filed Oct. 27, 2011, which claims the benefit of French Application No. 1058871 filed Oct. 27, 2010, the entire content of which is incorporated herein by reference.

FIELD

The present invention relates to processing of data for the management of placement on standby of a client terminal.

BACKGROUND

"Client terminal" refers to a device of a local network, configured to be connected to an access network by a set of connections of the copper, optical and/or radio type. The client terminal can be an individual terminal, dedicated to a user, or a group terminal, shared between several users.

"Access network" refers to a network providing multiplexing and connectivity between a local network and one or more service networks, possibly via one or more gathering networks. "Operator terminal" refers to a device of the access network.

Finally, the expression "placement on standby policy" refers to a set of rules relating to the conditions in which a placement on standby can be applied and/or to the type or types of standby to be applied. The placement on standby policy depends on the type of client terminal, for example individual or group, on a predetermined configuration of the client terminal and/or on services configured for the client terminal.

For example, the conditions in which a placement on standby can be applied are not the same in the presence of a limited availability service and in presence of a high availability service. In fact, a limited availability service is a service for which a power off corresponds to a switching off of the power supply of the client terminal and consequently to a switching off of the service. A limited availability service is a service for which a break in the service has little effect on the quality of experience. On the contrary, a high availability service is a service necessitating a high level of availability, for example a service of the intrusion detection, health monitoring, backup lines, etc. type. For such a high availability service, a break in service is harmful to the quality of experience.

Telecommunication operators deploy client terminals, in particular modems, in order to provide uses with an increasingly wide band connectivity allowing the multiplexing of services on a single medium.

The transmission technologies used are numerous, as are the types of networks. Each type of transmission technology and each type of network has its own constraints. Moreover, the configurations of gathering and service networks are chosen by the service operators and the configurations of the local networks are chosen by the users.

It is the responsibility of the access network operator, i.e. the telecommunication operator, to identify the best compromises making it possible to achieve energy saving whilst taking care of everyone's choices. In particular, it is the responsibility of the access network operator to identify conditions in which a placement on standby can be applied without being felt in a negative manner by the final user, in order to achieve energy saving without degrading the quality of service. It should be noted that, although the energy savings on each element are small on approaching the periphery of the network, the total saving becomes dominant because of the large number of terminations.

Several types of standby are known. For example, standby procedures of the PS (Power Shedding) type allow the selective placement on standby of service interfaces so as to extend the service life of a battery of a client terminal. However, standbys of this type have drawbacks. In particular, they require a prioritisation between interfaces, which can be implemented in a hardware manner in the client terminal without monitoring or control by the operator terminal.

Standbys of the "Dozing" type allow the placement on standby of all or part of a transmission chain in the client to network direction when the client does not have useful data to transmit. In this case, the management link between the operator terminal and the client terminal is also cut and the operator terminal cannot therefore determine, during the standby period, if the client terminal has failed and/or if the optical fibre is broken.

Standbys of the "Fast Sleep" or "Cyclic Sleep" type consist in the temporary switching off of the circuitry of the access network interface of the client terminal. The descending and ascending optical transmissions are no longer received during the standby period but are the subject of a protocol exchange defining the characteristics of the standby in order not to confuse standby and poor operation. In order not to have an excessive impact on the operation, a cyclic fast resumption is defined in order to allow the readjustment of the parameters between the operator terminal and the client terminal. The operator terminal must therefore keep active time slots in its frame cycle which allow a fast resumption of exchanges.

Standbys of the "Deep Sleep" type consist in a switching off resulting in a total loss of contact between the operator terminal and the client terminal. Only a physical action on the client terminal and/or a detection of activity on an access network interface then allows the resumption of exchanges.

Each of these types of standby is specifically adapted to a system and/or to a situation, and does not therefore make it possible, in a complex telecommunication network, to optimise the energy saving produced without degrading the quality of service.

SUMMARY

The present invention improves the situation.

For this purpose, the invention proposes a data processing method for the management of the placement on standby of a client terminal connected to an operator terminal of an access network. In particular, the method comprises the following steps implemented by said client terminal.

a) determining a policy for placing the client terminal on standby as a function of a type of the client terminal, of a predefined configuration of the client terminal and/or of services configured for the client terminal, b) monitoring a client interface of the client terminal, disposed between the client terminal and a part of a local network situated downstream of the client terminal, so as to determine a state of traffic on the client interface and, as a function of the state of traffic and of the policy for placing on standby, ordering the client interface to be placed on standby and then, when the client interface is on standby, c) monitoring an access network interface of the client terminal, disposed between the client terminal and the operator terminal, so as to determine a state of traffic on the access network interface and, as a function of the state of traffic and of the policy for placing on standby, sending the operator terminal a request to place the access network interface on standby.

This method thus makes it possible to harmonize different information sources in order to decide in an optimum manner on the placement of a client terminal on standby. Consequently, this method makes it possible to optimise the energy saving achieved without degrading the perceived quality of service.

The client terminal can be of the individual terminal type or of the group terminal type.

Step a) can comprise an operation of detection of the presence of a high availability service among the services configured for the client terminal.

The method preferably comprises a step for testing a standby interrupt condition. The test step is executed when the client interface and the access network interface are on standby. The method also comprises a step of ordering an exit from standby of the client interface and of the access network interface, which is executed when the condition of the test step is verified.

According to an embodiment of the invention, the method comprises the following steps implemented by the operator terminal d) determining a policy for placing the client terminal on standby as a function of a type of said client terminal, of a predefined configuration of said client terminal, and/or of services configured for said client terminal, and deducing if the client terminal is eligible for a placement on standby and, when the client terminal is eligible for a placement on standby, e) determining a state of traffic on said access network interface and, as a function of the state of traffic, ordering the placement on standby of said access network interface.

The access network is for example a passive optical network, the operator terminal being an optical line terminal, the client terminal being an optical network terminal.

The method can comprise, in the operator terminal, a step of management of the placement on standby of the operator terminal.

According to an embodiment of the invention, the step of management of the placement on standby of the operator terminal comprises operations for determining a number of client terminals connected to the operator terminal, for determining a state of standby of each of the user terminals and for ordering, when all the client terminals have been determined as being on standby, the placement on standby of a service network interface of the operator terminal, disposed between the access network and a network situated upstream of the access network.

The steps of the method can be carried out by a computer program.

Thus, the invention also relates to a computer program comprising instructions for the implementation of the above-mentioned method when this program is executed by a processor.

The computer program for the implementation of the data processing method can be executed in a specific device. Thus, the invention also relates to a client terminal able to be connected to an operator terminal of an access network, comprising a system for the management of placement on standby configured, when the client terminal is connected to the operator terminal, for:

determining a policy for placing the client terminal on standby as a function of a type of said client terminal, of a predefined configuration of said client terminal, and/or of services configured for said client terminal, monitoring a client interface of said client terminal, disposed between said client terminal and a part of a local network situated downstream of said client terminal, so as to determine a state of traffic on said client interface and, as a function of the state of traffic and of said policy for placing on standby, ordering said client interface to be placed on standby then, when the client interface is on standby, monitoring an access network interface of said client terminal, disposed between said client terminal and said operator terminal, so as to determine a state of traffic on said access network interface and, as a function of the state of traffic and of said policy for placing on standby, sending to said operator terminal a request to place said access network interface on standby.

The client terminal can comprise a module configured for providing the management of the access network interface, the placement on standby management system being configured for acting on power supply pins of the module.

According to another embodiment of the invention, the client terminal can comprise a module configured for providing the management of the access network interface, the placement on standby management system being integrated in said module.

According to another embodiment of the invention, the client terminal can comprise a module, configured for providing the management of the access network interface, comprising a pin specifically dedicated to the placement on standby, the placement on standby management system being configured to act on said pin.

The placement on standby management system can moreover be configured for separately ordering a MAC transmission power supply and a MAC reception power supply.

BRIEF DESCRIPTION OF THE DRAWINGS

Other features and advantages of the invention will become apparent on reading the description which follows. This is purely illustrative and must be read with reference to the attached drawings in which.

Figure 4:
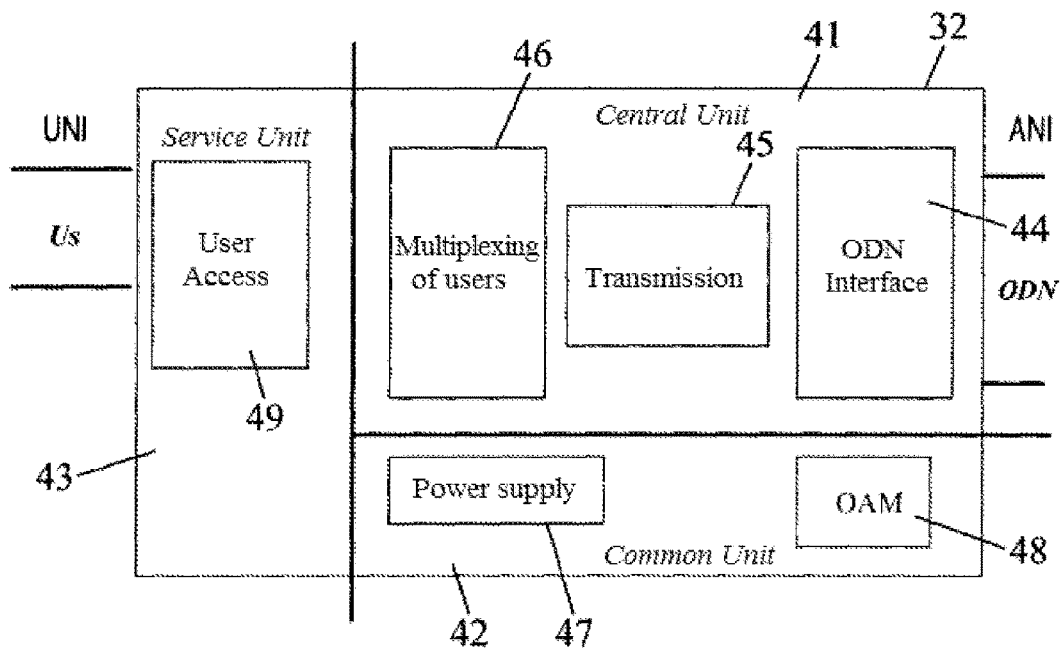
FIG. 4 is a functional diagram showing a client terminal of FIG. 3.
Figure 5:
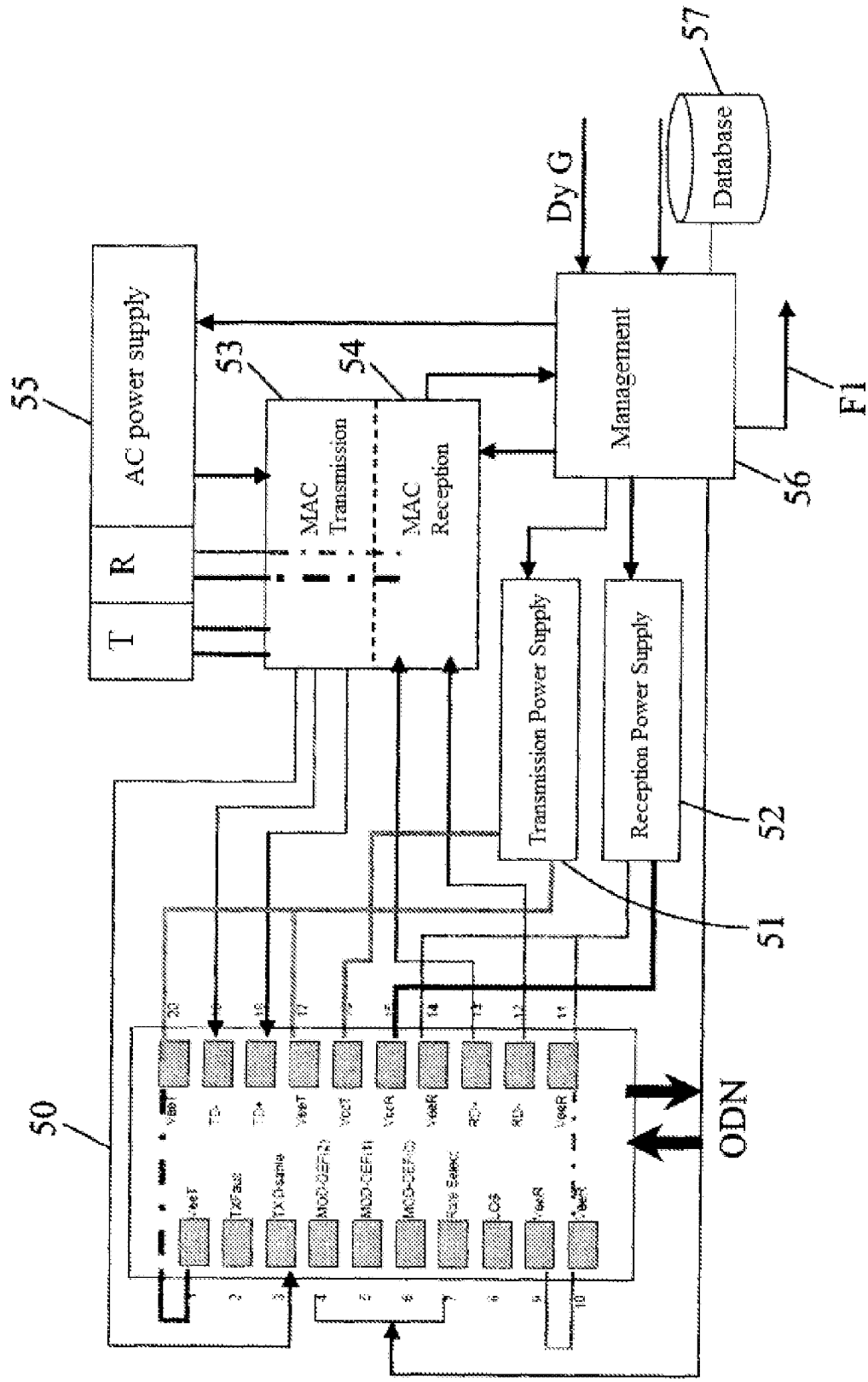
Figure 6:
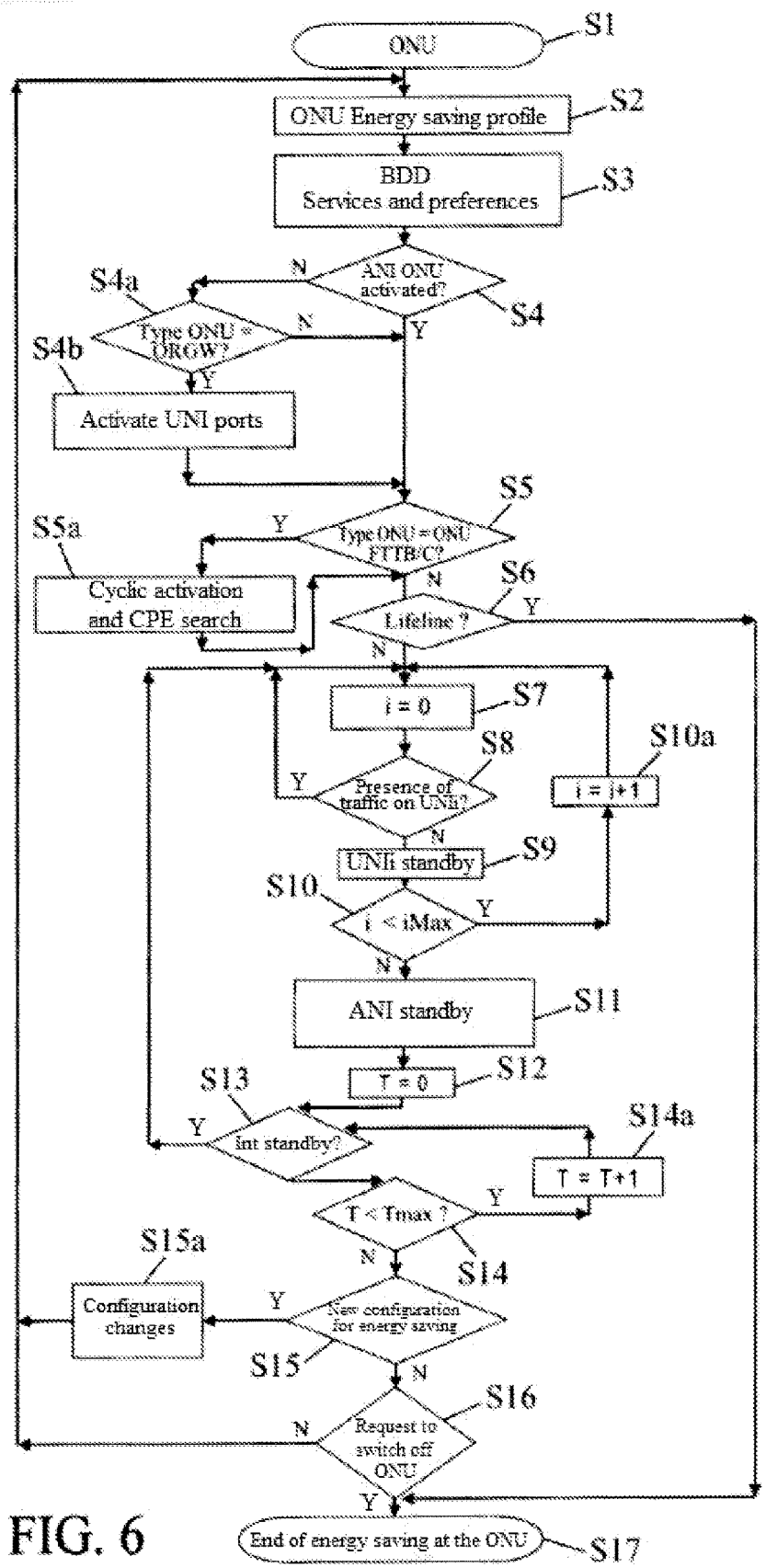
Figure 7:
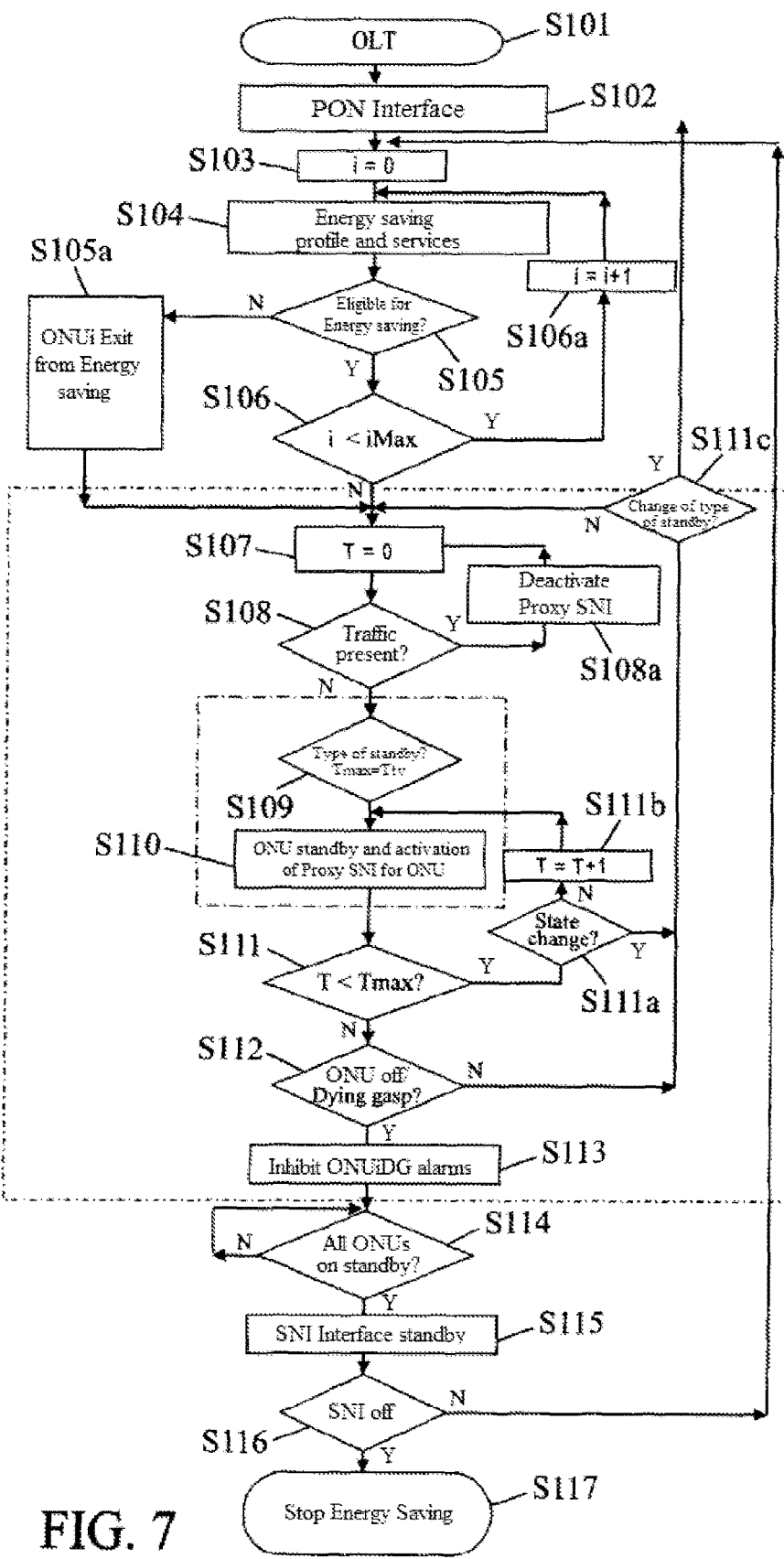
Figure 8:
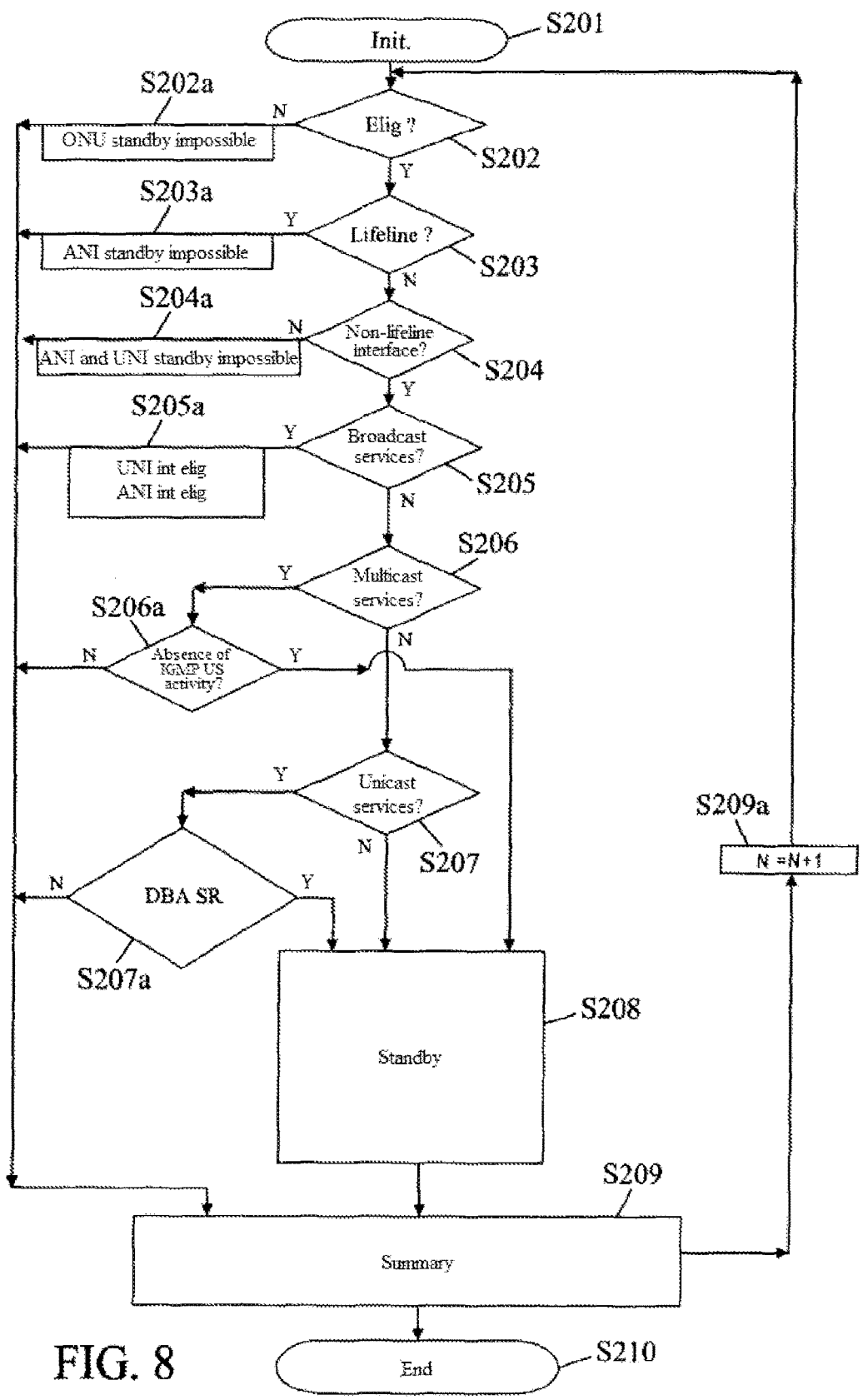

the FIG. 5 is a functional diagram showing a placement on standby management system of the client terminal shown in FIG. 4;

the FIG. 6 is a flowchart illustrating the steps of a method of management of the placement on standby of the client terminal shown in FIG. 4, it being possible for this flowchart to represent the general algorithm of the computer program within the meaning of the invention;

FIG. 7 is a flowchart illustrating the steps of a method of management of the placement on standby of an operator terminal connected with the client terminal shown in FIG. 4; and FIG. 8 is a flowchart illustrating the steps of a method for choosing a type of standby to apply to a client terminal.

DETAILED DESCRIPTION

Figure 1:
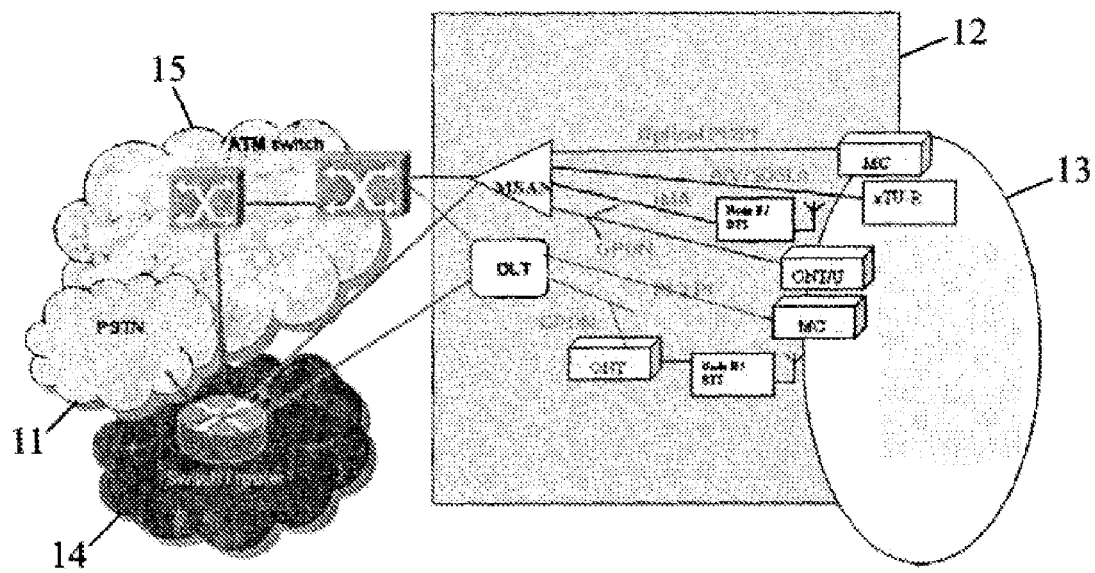
FIG. 1 is a simplified diagrammatic view of a set of networks connected with each other and forming a complex telecommunication network.

FIG. 1 shows a switched telephone network (STN) 11, an access network 12 a local network 13, an IP network 14 and an ATM network 15, which are connected between each other and form a complex telecommunication network.

The telephone network 11 is also called a PSTN (Public Switched Telephone Network) network. The local network local 13 can be individual or group. The access network 12 is configured for providing the multiplexing and the connectivity between the local network 13 and the service network 14, via the gathering network 15.

Figure 2:
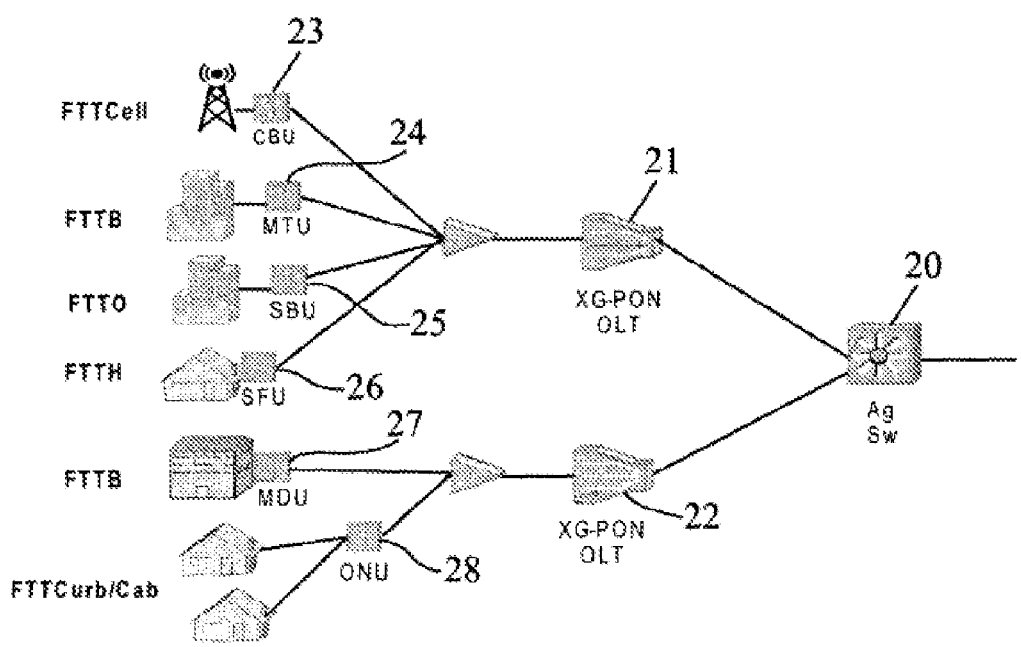
FIG. 2 is diagrammatic view showing in greater detail a local network and an access network of the telecommunication network shown in FIG. 1, according to an embodiment of the invention.

FIG. 2 partially shows the architecture of the access network 12 and of the local network 13, according to an embodiment of the invention in which the access network 12 is of the passive optical network (PON) type. The access network 12 comprises an aggregation switch 20 connected to two operator terminals 21 and 22, called OLT (Optical Line Terminal) terminals.

The local network 13 comprises six client terminals 23 to 28, called ONU (Optical Network Unit) terminals.

"Client interface", or UNI (User Network Interface) interface refers to an interface between an ONU terminal and the part of the local network situated downstream of said ONU terminal.

"Access network interface", or ANI (Access Network Interface) interface refers to the interface between an ONU terminal and the access network 2.

Finally, "service network interface", or SNI (Service Network Interface) interface refers to the interface between the access network and the part of the telecommunication network situated upstream of the access network, in this example the networks 11, 14 and 15 shown in FIG. 1.

The OLT terminals 21, 22 are configured for providing the SNI interface on the network side and are for example of the XG-PON type.

The ONU terminals 23 to 28 are configured for providing the UNI interface on the client side. The ONU terminals 23, 24, 25 and 26 are connected to the OLT terminal 21. The ONU terminals 27 and 28 are connected to the OLT terminal 22.

The ONU terminals 25 and 26 are individual terminals, called ONT (Optical Network Terminal) terminals, i.e. that they are each dedicated to a user. The ONU terminals 25, 26 use for example communication technologies of the FTTO (Fibre To The Office) or FTTH (Fibre To The Home) type. In the embodiment shown in FIG. 2 the ONU terminal 25 is of the SBU (Single Business Unit) type and the ONU terminal 26 is of the SFU (Single Family Unit) type.

The ONU terminals 23, 24, 27 and 28 are group terminals, i.e. they are shared between different users and use for example communication technologies of the FTTB (Fibre To The Building), FTTC (Fibre To The Cell) or FTTCab (Fibre To The Cab) type. In the embodiment shown in FIG. 2, the ONU terminal 23 is of the CBU (Cell-site Backhauling Unit) type, the ONU terminal 24 is of the MTU (Multi Tenant Unit) type, the ONU terminal 27 is of the MDU (Multi Dwelling Unit) type.

Figure 3:
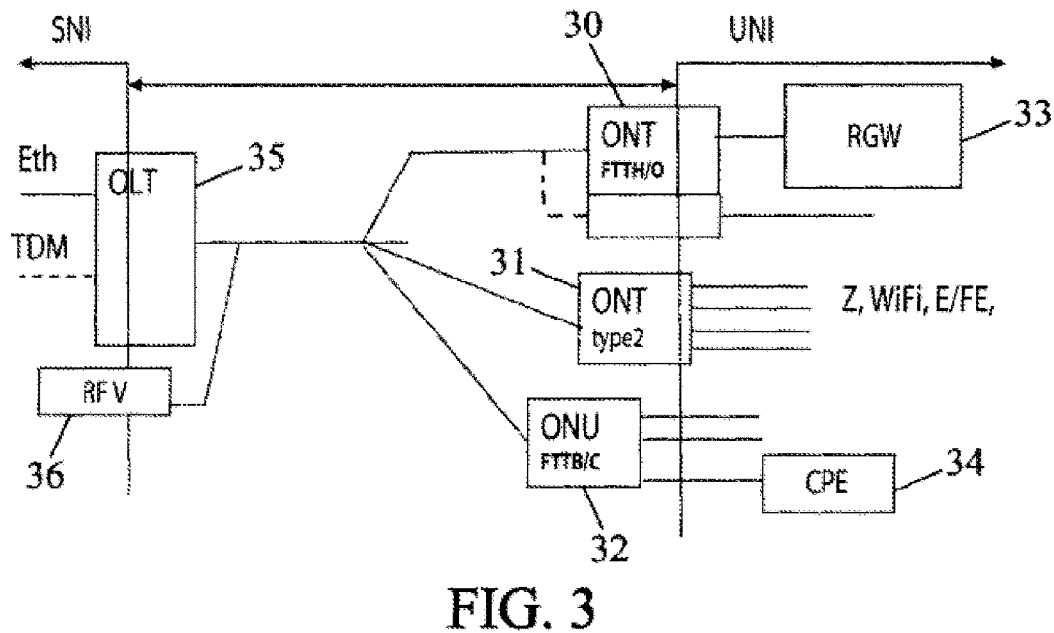
FIG. 3 is a view similar to that of FIG. 2 showing another embodiment of the invention.

FIG. 3 shows another embodiment of the invention in which an OLT terminal 35 is connected to three ONU terminals 30, 31, 32.

The ONU terminal 30 is an individual ONT terminal, for example a GPON (Gigabit Passive Optical Network) modem connected to a domestic gateway (RGW) 33 by an Ethernet, DSL (Digital Subscriber Line) or USB (Universal Serial Bus) interface.

The ONU terminal 31 is an individual ONT terminal of the optical domestic gateway type having a set of interfaces dedicated for each of the services provided to the user of the terminal 31. For example, for a provision of three services ("triple play" provision), the terminal 31 comprises a video interface of the RJ45 type, an interface for access to the Internet network of the RJ45, GbE (Gigabit Ethernet) or FE (Fast Ethernet) type, and a telephonic interface of the copper twisted pair type.

The ONU terminal 32 is a group optical termination and is for example disposed at the bottom of a building or nearby in order to be shared between several items of client equipment. The items of client equipment can comprise an item of equipment 34 of the CPE (Customer Premises Equipment) type connected by a DSL or Ethernet interface.

A video server 36 is connected to the OLT terminal 35 and allows the sending of video data to the ONU terminals 30, 31 and 32.

FIG. 4 shows the internal architecture of an ONU terminal, for example the ONU terminal 32, according to an embodiment of the invention. The terminal 32 comprises a central unit 41, a common unit 42 and a service unit 43.

The central unit 41 comprises line termination module 44, also called an ODN (Optical Distribution Network) interface. The line termination module 44 comprises a MAC (Media Access Control) layer unit which has the function of sequencing the transmission and reception of data in accordance with the transmission protocol used.

The line termination module 44 also comprises an optical transmission-reception unit 50 (FIG. 5), called an SFP (Small Form-factor Pluggable) module, comprising a transmitter, a receiver and a logic circuit. The transmitter comprises for example a laser diode and its driver. The receiver comprises for example an APD (Avalanche Photodiode) or PIN (Positive Intrinsic Negative diode) photodiode and a circuit for the amplification and regeneration of associated data. The function of the logic circuit is to manage the digital transmission and receives in real time instructions from an OLT terminal connected to the ONU terminal 32, for example via a frame header, in order to retrieve the frame frequency, which allows synchronisation during the transmission, and the clock, which allows the retrieval of the data.

The central unit 41 also comprises a transmission multiplex module 45 which has the function of providing the formatting of the data of the ANI interface during the insertion and extraction of data. The transmission multiplex module 45 also carries out a filtering of the useful data transmitted through the communication channel, as well as the insertion and extraction of the data used for the management of the terminal 32.

The central unit 41 can moreover comprise a multiplexing of users module 46, in particular when the ONU terminal 33 is a group terminal. The function of the module 46 is to direct the data coming from the network towards the physical output interface and conversely to direct the client data towards the queue corresponding to the QoS required by the service. The module 46 also has the function of allocating the right of speech between the users who share the resource.

The common cell 42 is configured to deal with all the functions that can be shared between the different units 41, 42, 43, the different services and the different items of client equipment served by the ONU terminal 32. In particular, one function of the unit 42 is the identification function, i.e. the function of authentication of the terminal 32 itself and also of the items of client equipment which are attached to it, in order to manage the rights of access to the resources and to block intentional or fortuitous malicious connection attempts. Another function of the unit 42 is the synchronisation and distribution of clock to the different constituent devices of the ONU terminal 32.

The unit 42 comprises an OAM (Operations And Maintenance) maintenance unit 48 which is configured to respond to requests from remote operators who wish to monitor the usage and correct operating statistics of the ONU terminal 32.

The unit 42 also comprises a power supply management unit 47 which is configured for supplying energy to the different units of the ONU terminal 32. The power supply management unit can include a maintenance battery for maintaining the services in the event of a cut in the power supply network. Such a maintenance battery is in particular used for high availability services, called "lifeline" services.

The service unit 43 comprises a user access unit 49 configured for managing the UNI interfaces aspect per client (FTTB/C/Cab), and per service (optical gateway). It optionally carries out the multiplexing on a common interface of several services (DSL+POTS) on twisted pair if the integration of the IP services is not carried out.

In the case where a separate management function is necessary, it is possible that the management of this service unit 43 is carried out remotely by a services operator which has an ACS (Auto Configuration Server) server.

FIG. 5 shows a management system for placing the ONU terminal 32 on standby, comprising a transmitter power supply module 51, a receiver power supply module 52, a transmission power supply control module MAC 53, a reception power supply control module MAC 54, a power supply module MAC 55, and an energy saving management module 56.

The management system for placing on standby is configured for selectively applying several types of standby. For example a standby of the Power Shedding (PS) type allowing the selective placement on standby of network interfaces, a standby of the "Dozing" type allowing the placement on standby of all or part of a transmission chain for the client to network direction when the client does not have useful data to transmit, a standby of the temporary switch-off (Fast Sleep or Cyclic Sleep) type, consisting in a temporary switch-off of the access network interface circuitry of the client terminal, and/or a standby of the total switch-off (Deep sleep) type consisting in a switch-off resulting in a total loss of contact between the operator terminal and the client terminal.

The transmission power supply module 51 is connected to transmission power supply pins of the module 50. The reception power supply module 52 is connected to reception power supply pins of the module 50. The modules 51 and 52 can be disposed in the ONU terminal 32 between the power supply function module 47 and the ODN interface module 44. The separation of the power supply of the reception logic and the power supply of the transmission logic makes it possible to increase the impact of a placement on standby of the Dozing type, which makes it possible to optimise the overall consumption of the ONU terminal.

The MAC transmission power supply control 53 and MAC reception power supply control 54 modules are respectively connected to transmission and reception power supply pins of the module 50. The modules 53 and 54 are also connected to the MAC power supply module 55. The module 53 is configured for ordering the activation of a switch-off command ("Tx disable" command) of the module 50 in the case where the module 50 implements a power saving function on the basis of this command. The MAC transmission and MAC reception commands are thus separate. The module 55 executes the instructions coming from the modules 53 and 54. The modules 53, 54 and 55 can be implemented in the transmission multiplex module 45.

The energy saving management module 56 is configured for controlling the other modules of the placement on standby management system in order to manage the placements on standby of the ANI and UNI interfaces of the ONU terminal 32, according to one or more of the types of standby mentioned above. It should be noted that in the case of standbys of the Cyclic Sleep and Deep Sleep type, the management includes maintaining the energy of the energy saving management module 56 and an internal clock sufficiently stable for determining the end of the standby with sufficient accuracy to remain synchronised with the OLT terminal and in particular in order not to exit from the common time slots allowing the resynchronisation of the transmission.

The energy saving management module 56 is configured for receiving a signal initiating a placement on standby and a resumption of activity, the signal specifying the type of standby. A placement on standby command can by example be activated on recognition of a PLOAM (Physical Layer Operations, Administration and Maintenance) or OMCI (Optical network termination management and control interface) item of information.

The energy saving management module 56 can also initiate a placement on standby as a function of a local configuration stored in a database 57.

When a placement on standby is initiated, the energy saving management module 56 sends a placement on standby of the UNI interfaces command, as symbolised by the arrow F1.

In the context of a multi-speed modulation transmission capable of adapting the on line data rate, in order to obtain a saving of power consumed, the energy saving management module 56 is also configured for generating a speed choice command. In this case, a selection of combination of modulation speeds (US & DS) command is sent by the energy saving management module 56 to the module 50, the command being coordinated with a similar synchronous command to the modules 53 and 54.

Operation in low speed mode therefore benefits from coupling with a dynamic bandwidth allocation (DBA) mode which is a function of the client requirement, i.e. it depends on an observation of the real data rate consumed by the client. Thus, if a user is viewing a video channel, a wide band descending signal and an ascending signal comprising only the IGMP (Internet Group Management Protocol) responses are observed. It is then unnecessary to maintain a wide band capability in the ascending direction. A reduced number of time slots can therefore be allocated for the ascending direction, which results in a brief transmission time per frame for the ascending direction. Moreover, during the speech time of the ONU terminal 32, the traffic can be transmitted with a low modulation speed thus saving consumption with is often proportional to the clock speed.

Several embodiments are possible for the implementation of the placement on standby management system.

According to a first embodiment, shown in FIG. 5, the management is completely outside of the module 50 and is carried out by external logic acting on the power supply pins of the module 50. Thus a placement on standby of the Dozing type switches off the power supply of the pins of the transmitter, and a placement on standby of the Cyclic Sleep type switches off all of the power supplies.

According to a second embodiment, the placement on standby management is carried out internally starting from an RSSI (Received Signal Strength Indication) interface of the module 50, by the definition of a message or of a specific command. In this embodiment, the energy saving management module 56, allowing the switch-off of power supply of the transmitter or of the transmitter-receiver assembly, is disposed in the module 50. The RSSI recognition logic must then remain under power in order to allow an exit from the standby mode.

According to a third embodiment the management is carried out internally starting from a control signal, called an "enable" signal. It is then possible, in order to command a placement on standby of the Dozing type, to use the inhibit pin of the transmitter of the module 50. The design of the module 50 and of the external logic are then adapted so that an action on this pin is recognised.

According to a fourth embodiment, the module 50 comprises an additional pin dedicated to the placement on standby. This embodiment makes it possible to optimise the implementation and the times of placement on standby and of resumption.

A method of management of the placement on standby of the ONU terminal 32 will now be described with reference to FIG. 6.

Steps S1 to S3 are the steps of initialisation of the ONU terminal 32.

In step S1, the ONU terminal 32 is powered up.

In step S2, information relating to a configuration of the energy saving profile stored for the ONU terminal 32 is loaded by the management module 56 from the database 57.

In step S3, the management module 56 loads data relating to the services configured for the ONU terminal 32, as well as data relating to client preferences.

Steps S4 to S6 are steps of adaptation of the energy saving management policy of the UNI interfaces as a function of the type of ONU terminal and of the configuration data originating from the client or from a third party operator.

In step S4, the energy saving management module 56 tests a condition of activation of the ANI interface of the ONU terminal 32. If the condition is verified, the method proceeds to step S5, otherwise the method proceeds to step S4a.

In step S4a, the energy saving management module 56 tests a condition of type of ONU terminal corresponding to an individual terminal (ORGW). If the condition is verified, the method proceeds to step S4b, otherwise the method proceeds to step S5.

In step S4b, the energy saving management module 56 activates the UNI ports in the ONU terminal 32 as a function of the data retrieved in step S3, i.e. the UNI ports validated in the profile by the client. Then the method proceeds to step S5.

In step S5, the energy saving management module 56 tests a condition of type of ONU terminal corresponding to a group terminal (FTTB/C). If the condition is verified, the method proceeds to step S5a, otherwise the method proceeds to step S6.

In step S5a, the energy saving management module 56 carries out a cyclic activation and searches for the presence of items of user equipment (CPE) on the ports of the ONU terminal 32. Then the method proceeds to step S6.

In step S6, the energy saving management module 56 tests a condition of presence of a high availability service (lifeline). If the condition is verified, the method proceeds to step S17, otherwise the method proceeds to step S7.

Steps S7 to S10 are steps of monitoring the states of the UNI interface and of the traffic.

In step S7, a variable i is set to zero.

In step S8, the energy saving management module 56 tests a condition of the presence of traffic on the UNI interface. If the condition is verified, the method returns to step S7, otherwise the method proceeds to step S9.

In step S9, the energy saving management module 56 orders a placement on standby of the UNI interface.

In step S10, the energy saving management module 56 tests if the value of the variable i is less than a predetermined value $i_{max}$. If the condition is verified, the method proceeds to step S10a, otherwise the method proceeds to step S11.

In step S10a, the variable i is incremented: i=i+1. Then the method returns to step S7.

Steps S11 to S15 are steps of placement on standby of the ONU terminal 32 over a cycle time which depends of the type of ONU terminal, on the type of standby utilised and on its interrupt modes.

In step S11, the OLT terminal 35 connected to the ONU terminal 32 orders, in response to a request from the energy saving management module 56, the ANI interface of the ONU terminal 32 to be placed on standby. The standby time Tstandby is fixed at a predetermined value Tmax. The generation of the command by the OLT terminal is described in detail with reference to FIG. 7.

In step S12, a variable T is set to zero.

In step S13, the energy saving management module 56 tests a condition for interruption of standby. If the condition is verified, the method returns to step S7, otherwise the method proceeds to step S14.

In step S14, the energy saving management module 56 tests a condition of the value of the variable T less than a predetermined value Tmax. If the condition is verified, the method proceeds to step S14a, otherwise the method proceeds to step S15.

In step S14a, the variable T is incremented: T=T+1. Then the method returns to step S13.

In step S15, the energy saving management module 56 tests a condition of new energy saving configuration. If the condition is verified, the method proceeds to step S15a, otherwise the method proceeds to step S16.

In step S15a, the energy saving management module 56 stores the energy saving configuration changes. Then the method returns to step S2.

Steps S16 and S17 are steps of voluntary local switching off of the ONU terminal 32 or of exiting from the energy saving mode.

In step S16, the management module 56 tests a condition of request to switch off the ONU terminal 32. If the condition is verified, the method proceeds to step S17, otherwise the method returns to step S2.

In step S17, the energy saving management module 56 orders the end of the standby of the ONU terminal 32.

This method thus makes it possible to make the different sources of information to be monitored consistent in order to decide in an optimum manner on the placement on standby of an ONU terminal, in particular the general logic configuration state, the configuration state of the UNI interfaces, the state of traffic on the UNI interfaces, the state of the power supply of the ONU terminal and the actions on an on/off button of the ONU terminal.

In fact, if the managing operator of the ONU terminal has not provided with the logic resources necessary for the establishment of traffic, there is no need to power the UNI interface or interfaces present.

If local services are possible, then the power supply of the UNI interfaces must be carried out according to the wishes of the client or according to a default mode proposed by the operator allowing the client to enter his preferences, via an interface activated by default, as a function of his local needs (LAN, Home network).

If the ONU terminal 32 comprises an automatic putting into service of CPE, the application of the managing operator's putting into service policy can be applied either according to a technician's configuration from the OLT terminal, or blindly with a periodic power supply of the UNI interface and attempts to activate and search for the presence of CPE.

If a UNI interface test procedure must be carried out before the putting into service, a temporary forced power supply can be authorized for the duration of the test.

The method makes it possible to manage the activation of the placement in reduced consumption or standby mode, per port, and to manage the detection of absence of traffic and to manage the operation per module, i.e. per group of physical ports.

The state of the power supply of the ONU terminal 32 can be taken into consideration for ordering a nominal operation when the ONU terminal 32 is connected to the mains, and for ordering an energy saving mode when the ONU terminal 32 is running on battery power.

In a multi-operator environment, a database of the service characteristics of each service-providing operator can be set up in advance. This database can in particular contain information relating to the presence of services not eligible for placement on standby, to the type of placement on standby acceptable for each service, to an order of priority between interfaces and services, to the presence of management/supervision (OAM) data flow of an end-to-end transmission or of a segment independent of the operation of the service, and/or to the need for a proxy identification/authentication maintenance network. For example, the compatibility of the placement on standby with a pre-programmed video recording service can require maintaining connectivity or an automatic early resumption of operation.

This method can moreover allow the setting up of a system of invoicing the services provider as a function of the energy consumed by the ONU terminal 32 and/or of invoicing the client in the case of excess consumption due to a minimalist configuration.

A management method for placing the OLT terminal 35 connected to the ONU terminals 30, 31 and 32 on standby is described below with reference to FIG. 7.

Steps S101 to S106 are steps of initialisation and/or of updating data relating to energy saving profile configurations and to services associated with the ONU terminals 30, 31, 32.

In step S101, the OLT terminal 35 is powered up.

In step S102, a PON interface of the OLT terminal 35 is activated.

In step S103, a variable i is set to zero. The variable i is associated with the ONU terminals connected to the OLT terminal. In this case, three ONU terminals 30, 31, 32 are connected to the OLT terminal 35. The variable i can therefore take the values i=0, i=1 and i=2, each value being associated with an ONU terminal. For example, the ONU terminal 30 is associated with the value '0' and is called terminal $ONU_0$, the ONU terminal 31 is associated with the value '1' and is called terminal $ONU_1$, and the ONU terminal 32 is associated with the value '2' and is called terminal $ONU_2$.

In step S104, the OLT terminal 35 loads the data relating to a configuration of the energy saving profiles and to services associated with the terminal $ONU_0$.

In step S105, the OLT terminal 35 tests a condition of eligibility of the terminal $ONU_0$ for placement on standby. If the condition is verified, the method proceeds to step S106, otherwise the method proceeds to step S105a.

In step S105a, the terminal $ONU_0$ is determined as not being able to be put on standby. The method then proceeds to step S107.

In step S106, the OLT terminal 35 tests a condition of the value of the variable i less than a predetermined value $i_{max}$. The value $i_{max}$ is a function of the number of ONU terminals connected to the OLT terminal 35. In this case $i_{max}$=2. If the condition is verified, the method proceeds to step S106a, otherwise the method proceeds to step S107.

In step S106a, the variable i is incremented: i=i+1. Then the method returns to step S104.

Steps S107 to S113 constitute a placement on standby loop, which is applied to each ONU terminal capable of being placed on standby.

In step S107, a variable T is set to 0.

In step S108, the OLT terminal 35 tests a condition of presence of traffic connected related to the ONU terminal selected for the current passage in the loop, for example terminal 30. The search for the presence of traffic can be carried out using statistics originating from the UNI interface or by a DBA monitoring. If the condition is verified, the method proceeds to step S108a, otherwise the method proceeds to step S109.

In step S108a, the OLT terminal 35 deactivates the proxy SNI for the selected terminal 30. Then the method returns to step S107.

In step S109, the OLT terminal 35 determines a type of standby. Then a standby time Tstandby is set to a predetermined value Tmax. The duration of standby parameter Tstandby depends of the type of standby. The choice of type of standby is described in detail with reference to FIG. 8.

In step S110, the OLT terminal 35 orders the placement on standby of the selected ONU terminal 30 and activates proxy SNI for the selected ONU terminal 30.

In step S111, the OLT terminal 35 tests a condition of the value of the variable T less than the predetermined duration Tmax. If the condition is verified, the method proceeds to step S111a, otherwise the method proceeds to step S112.

In step S111a, the OLT terminal 35 tests a change of status condition. The purpose of this test is to take account of exit from standby conditions provided in each of the standardized types of standby. If the condition is verified the method proceeds to step S111c, otherwise the method proceeds to step S111b.

In step S111b, the variable T is incremented: T=T+1. Then the method returns to step S110.

In step S111c, the OLT terminal 35 tests a change of type of standby condition. If the condition is verified, the method returns to step S103, otherwise the method returns to step S107.

In step S112, the OLT terminal 35 tests a condition of switching off the selected ONU terminal 30. If the condition is verified the method proceeds to step S113, otherwise the method returns to step S111c.

In step S113, the OLT terminal 35 orders the inhibition of the alarms for the selected ONU terminal 30.

The loop is repeated in a similar way for each client terminal connected to the OLT terminal 35, therefore in this example for the ONU terminals 31 and 32.

Steps S114 to S117 are summary steps of placement on standby for the whole of the SNI interface, i.e. for the set of ONU terminals 30, 31, 32.

In step S114, the OLT terminal 35 tests a condition of standby of all the ONU terminals 30, 31, 32. If the condition is verified, the method proceeds to step S115. Otherwise the method returns to step S114, the loop being carried out according to a polling time.

In step S115, the OLT terminal 35 orders the placement on standby of its PON interface.

In step S116, the OLT terminal 35 tests a condition of switching off the PON interface. If the condition is verified, the method proceeds to step S117, otherwise the method returns to step S103.

In step S117, the OLT terminal 35 stops the standby of its SNI interface and of the proxy for all the ONU terminals connected to the OLT terminal 35.

This method thus allows network and service operators to protect themselves from floods of alarm messages resulting from a placement on standby, to ensure the stability of the network, and to save energy by ordering placements on standby whilst ensuring resumption times as short as possible in order to retain a good quality of service.

The OLT terminal, as the first network device, is well suited for managing the detection and implementation of systems for placing the ONU terminals on standby. The OLT terminal, on the basis of the status information received from each ONU terminal, can produce a hierarchic ordering of the alarms so as to transmit to the different elements of the network only the one of highest level or an alarm summary. This allows the propagation of information without flooding the network with redundant information by so doing. The OLT terminal can therefore be said to have a proxy function.

The OLT terminal can also activate a routine of response to request messages for the ONU terminals declared to be on standby. In this case, the OLT terminal will respond to the Ethernet OAM messages in order to maintain the network availability statistics, to the IGMP commands in order to maintain broadcast and multicast streams in the package at least over the cycle (dozing) time, and to the applications for network authentication confirmation if there has not been a break in the connectivity (IP address, DNS, etc.).

A method of choosing a type of standby to be applied to an ONU terminal will now be described with reference to FIG. 8.

In step S201, the method is initialised.

In step S202, the OLT terminal 35 tests a condition of eligibility of the ONU terminal for a placement on standby. This test is by example carried out by searching in operator-client contracts to see if a placement on standby is possible and under what conditions. The database of the service characteristics described above can be used. When the condition is verified the method proceeds to step S203, otherwise the method proceeds to step S202a.

In step S202a, the OLT terminal 35 determines that the placement on standby of the ONU terminal is impossible. Then the method proceeds to step S209.

In step S203, the OLT terminal 35 tests a condition of presence of a high availability service. When the condition is verified the method proceeds to step S203a, otherwise the method proceeds to step S204.

In step S203a, the OLT terminal 35 determines that a placement on standby of the ANI interface of the ONU terminal is impossible. Then the method proceeds to step S209.

In step S204, the OLT terminal 35 tests a condition of presence of an interface which is not a high availability one. When the condition is verified the method proceeds to step S205, otherwise the method proceeds to step S204a.

In step S204a, the OLT terminal 35 determines that the placement on standby of the ANI and ONU interfaces is impossible. Then the method proceeds to step S209.

In step S205, the OLT terminal 35 tests the presence of broadcast services. When the condition is verified the method proceeds to step S206, otherwise the method proceeds to step S205a.

In step S205a, the OLT terminal 35 determines that the UNI interface of the ONU terminal is eligible for a placement on standby of the Power Shedding type, and that the ANI interface is eligible for a placement on standby of Dozing type. Then the method proceeds to step S209.

In step S206, the OLT terminal 35 tests a condition of presence of multicast services. When the condition is verified the method proceeds to step S207, otherwise the method proceeds to step S206a.

In step S206a, the OLT terminal 35 tests a condition of absence of IGMP (Internet Group Management Protocol) activity. When the condition is verified the method proceeds to step S207, otherwise OLT terminal 35 determines that a placement on standby of the ANI and UNI interfaces is contradictory to a service in progress and the method proceeds to step S209.

In step S207, the OLT terminal 35 tests a condition of presence of unicast services. When the condition is verified the method proceeds to step S208, otherwise the method proceeds to step S207a.

In step S207a, the OLT terminal 35 tests a condition of empty bandwidth allocation (DBA) or of a set of allocated slots attributed to be empty. When the condition is verified the method proceeds to step S208, otherwise the OLT terminal 35 determines that a placement on standby of the ANI and UNI interfaces is contradictory to a service in progress and the method proceeds to step S209.

In step S208, the OLT terminal 35 determines that none of the remote services provided is active. A standby of the Cyclic or Deep Sleep type can be applied to the ANI interface.

In step S209, the OLT terminal 35 produces a summary of the energy saving possible for the ONU terminal. The method then proceeds to steps S209a and S210.

In step S209a, a variable N is incremented: N=N+1 and the method returns to step S202. The variable N represents the ONU terminals connected to the OLT terminal 35. The loop is restarted for each ONU terminal.

In step S210, the method is ended.

The methods described above make it possible to optimise the energy saving whilst retaining the quality of service.

It should be noted that, when an ONU terminal is shared between several clients or is only a relay providing the gathering of antennas of radio/terrestrial/mobile networks, the energy saving does not depend on a client but on a group of clients. A policy of placing on standby must then take account of a set of parameters, in particular a detection of absence of traffic and of operations for the whole of the system, a management of the UNI interfaces allowing individual power supply and a repercussion of a system indication of the placement on standby of items of downstream equipment on an interface.

In fact, it is advantageous to warn the items of equipment managing each of the layers and applications, in particular for the deletion/hiding of the alarms generated by a state of standby which corresponds to a normal operation. It is also advantageous to provide "courtesy" information to the remote management platforms so that they do not attempt maintenance operations doomed to failure, in real time or not, for example a downloading of software updates.

An agent can moreover be used for taking responsibility for automatic mechanisms allowing a fast resumption when exiting the standby state in order to re-establish the communication and minimise the nuisance caused.

The present invention is not of course limited to the embodiments described above by way of examples; it extends to other variants.

For example, the connections between the OLT terminal and the ONU terminals are not necessarily of optical type but can also be of the copper and/or radio type.

The invention claimed is:

1. A data processing method for the management of the placement on standby of a network unit connected between an operator terminal of an access network and a part of a local network situated downstream of said network unit, the method comprising the following steps implemented by said network unit:
   a) determining a policy for placing the network unit on standby as a function of a type of said network unit, of a predefined configuration of said network unit and/or of services configured for said network unit,
   b) monitoring a client interface of said network unit, disposed between said network unit and the part of the local network situated downstream of said network unit, said part of the local network comprising at least one electronic device, so as to determine a state of traffic on said client interface to or from said part of the local network and, as a function of the state of traffic and of said policy for placing on standby, ordering said client interface to be placed on standby and then, when the client interface is on standby,
   c) monitoring an access network interface, disposed between said network unit and said operator terminal, so as to determine a state of traffic on said access network interface and, as a function of the state of traffic and of said policy for placing on standby, sending to said operator terminal a request to place said access network interface on standby.

2. The method according to claim 1, wherein said network unit is of the individual terminal type terminal or of the group terminal type.

3. The method according to claim 1, wherein step a) comprises an operation of detection of the presence of a high availability service among the services configured for said network unit.

4. The method according to claim 1, comprising a step for testing a standby interrupt condition which is executed when the client interface and the access network interface are on standby, and a step of ordering an exit from standby of the client interface and of the access network interface, which is executed when the condition of the test step is verified.

5. The method according to claim 1, comprising the following steps implemented by the operator terminal:
   d) determining a policy for placing the network unit on standby as a function of a type of said network unit, of a predefined configuration of said network unit, and/or of services configured for said network unit, and deducing if the network unit is eligible for a placement on standby and, when the network unit is eligible for a placement on standby,
   e) determining a state of traffic on said access network interface and, as a function of the state of traffic, ordering the placement on standby of said access network interface.

6. The method according to claim 1, wherein the access network is a passive optical network, the operator terminal being an optical line terminal, the network unit being an optical network terminal.

7. The method according to claim 1, comprising, in said operator terminal, a step of management of the placement on standby of said operator terminal.

8. The method according to claim 7, wherein the step of management of the placement on standby of said operator terminal comprises operations for determining a number of network units connected to said operator terminal, for determining a state of standby of each of said user terminals and for ordering, when all the network units have been determined as being on standby, the placement on standby of a service network interface of said operator terminal, disposed between the access network and a network situated upstream of the access network.

9. A non-transitory storage medium storing computer program instructions for the implementation of the method according to claim 1 when this program is executed by a processor.

10. A network unit able to be connected between an operator terminal of an access network and a part of a local network situated downstream of said network unit, comprising a system for the management of placement on standby configured, when the network unit is connected to the operator terminal, for:
   determining a policy for placing the network unit on standby as a function of a type of said network unit, of a predefined configuration of said network unit, and/or of services configured for said network unit,
   monitoring a client interface of said network unit, disposed between said network unit and the part of the local network situated downstream of said network unit, said part of the local network comprising at least one electronic device, so as to determine a state of traffic on said client interface to or from said part of the local network and, as a function of the state of traffic and of said policy for placing on standby, ordering said client interface to be placed on standby and then, when the client interface is on standby,
   monitoring an access network interface, disposed between said network unit and said operator terminal, so as to determine a state of traffic on said access network interface and, as a function of the state of traffic and of said policy for placing on standby, sending to said operator terminal a request to place said access network interface on standby.

11. The network unit according to claim 10, comprising a module configured for providing the management of the access network interface, the placement on standby management system being configured for acting on power supply pins of the module.

12. The network unit according to claim 10, comprising a module configured for providing the management of the access network interface, the placement on standby management system being integrated in said module.

13. The network unit according to claim 10, comprising a module, configured for providing the management of the access network interface, comprising a pin specifically dedicated to the placement on standby, the placement on standby management system being configured to act on said pin.

14. The network unit according to claim 10, wherein the placement on standby management system is configured for separately ordering a MAC transmission power supply and a MAC reception power supply.

* * * * *